US009438147B2

(12) United States Patent
Ariga et al.

(10) Patent No.: US 9,438,147 B2
(45) Date of Patent: Sep. 6, 2016

(54) POSITION DETECTING APPARATUS AND DRIVING SYSTEM

(71) Applicant: Kabushiki Kaisha Toshiba, Minato-ku, Tokyo (JP)

(72) Inventors: Hiroshi Ariga, Yokohama (JP); Masahiro Inoue, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 292 days.

(21) Appl. No.: 14/192,268

(22) Filed: Feb. 27, 2014

(65) Prior Publication Data

US 2015/0015175 A1      Jan. 15, 2015

(30) Foreign Application Priority Data

Jul. 12, 2013   (JP) .................................. 2013-146893

(51) Int. Cl.
| | | |
|---|---|---|
| G05B 19/23 | (2006.01) | |
| H02P 6/00 | (2016.01) | |
| G01D 5/244 | (2006.01) | |
| H02P 6/16 | (2016.01) | |

(52) U.S. Cl.
CPC .............. *H02P 6/006* (2013.01); *G01D 5/2448* (2013.01); *H02P 6/16* (2013.01)

(58) Field of Classification Search
USPC .............. 318/653, 601, 400.03, 400.06, 678, 318/691; 324/207.12, 207.13, 207.14, 324/207.2, 179, 529
See application file for complete search history.

(56) References Cited

U.S. PATENT DOCUMENTS

| | | | | |
|---|---|---|---|---|
| 5,453,684 | A * | 9/1995 | Nakayama ......... | G01D 5/24452 318/632 |
| 5,663,643 | A * | 9/1997 | Matuyama ......... | G01D 5/24476 324/207.12 |
| 5,955,861 | A * | 9/1999 | Jeong ...................... | H02P 6/185 318/400.09 |
| 6,873,148 | B2 | 3/2005 | Morimoto | |
| 7,863,850 | B2 * | 1/2011 | Fu ........................... | G03B 27/42 318/400.39 |
| 7,933,373 | B2 | 4/2011 | Kishibe et al. | |
| 8,018,224 | B2 * | 9/2011 | Kurumado ............. | G01D 5/145 324/207.25 |
| 2003/0210035 | A1 * | 11/2003 | Manlove .................. | G01D 3/02 324/166 |
| 2004/0000903 | A1 | 1/2004 | Morimoto | |
| 2010/0091926 | A1 | 4/2010 | Kishibe et al. | |

FOREIGN PATENT DOCUMENTS

| | | |
|---|---|---|
| JP | 2000-356733 A | 12/2000 |
| JP | 2004-037121 A | 2/2004 |
| JP | 2004-226124 A | 8/2004 |
| JP | 4453758 B2 | 4/2010 |

* cited by examiner

*Primary Examiner* — Jorge L Carrasquillo
(74) *Attorney, Agent, or Firm* — White & Case LLP

(57) ABSTRACT

The position detecting apparatus includes a comparing part that compares the value of the digital signal output from the AD converter and a reference value that is based on a preset reference amplitude at the timings and outputs a control signal responsive to a result of the comparison. The position detecting apparatus includes an amplitude controlling part that controls amplification factors of the first amplifier and the second amplifier in such a manner that the value of the digital signal output from the AD converter comes closer to the reference value in response to the control signal output from the comparing part.

20 Claims, 3 Drawing Sheets

POSITION DETECTING APPARATUS AND DRIVING SYSTEM

CROSS-REFERENCE TO RELATED APPLICATION

This application is based upon and claims the benefit of priority from the prior Japanese Patent Application No. 2013-146893, filed on Jul. 12, 2013, the entire contents of which are incorporated herein by reference.

BACKGROUND

1. Field

Embodiments described herein relate generally to a position detecting apparatus and a driving system.

2. Background Art

As a means of position detection for a linear motor or the like, an arrangement is used in which a magnetic scale, an MR sensor (magnetic reluctance sensor) or the like operates in two phases. Such a position detecting arrangement incorporates a detector that uses the analog signal level of the MR sensor and means for counting the MR signal wave number to improve the resolution of the magnetic scale. In such an arrangement, however, a deviation among the amplitude levels of the analog signals and a direct-current offset cause a decrease of the position detection precision.

To overcome the problems, changes in amplitude and offset with temperature are compensated for. However, only an open loop control, such as compensation based on early learning or a coefficient, is conducted, and the accuracy of the amplitude of the signal is not assured.

DETAILED DESCRIPTION

Figure 1:
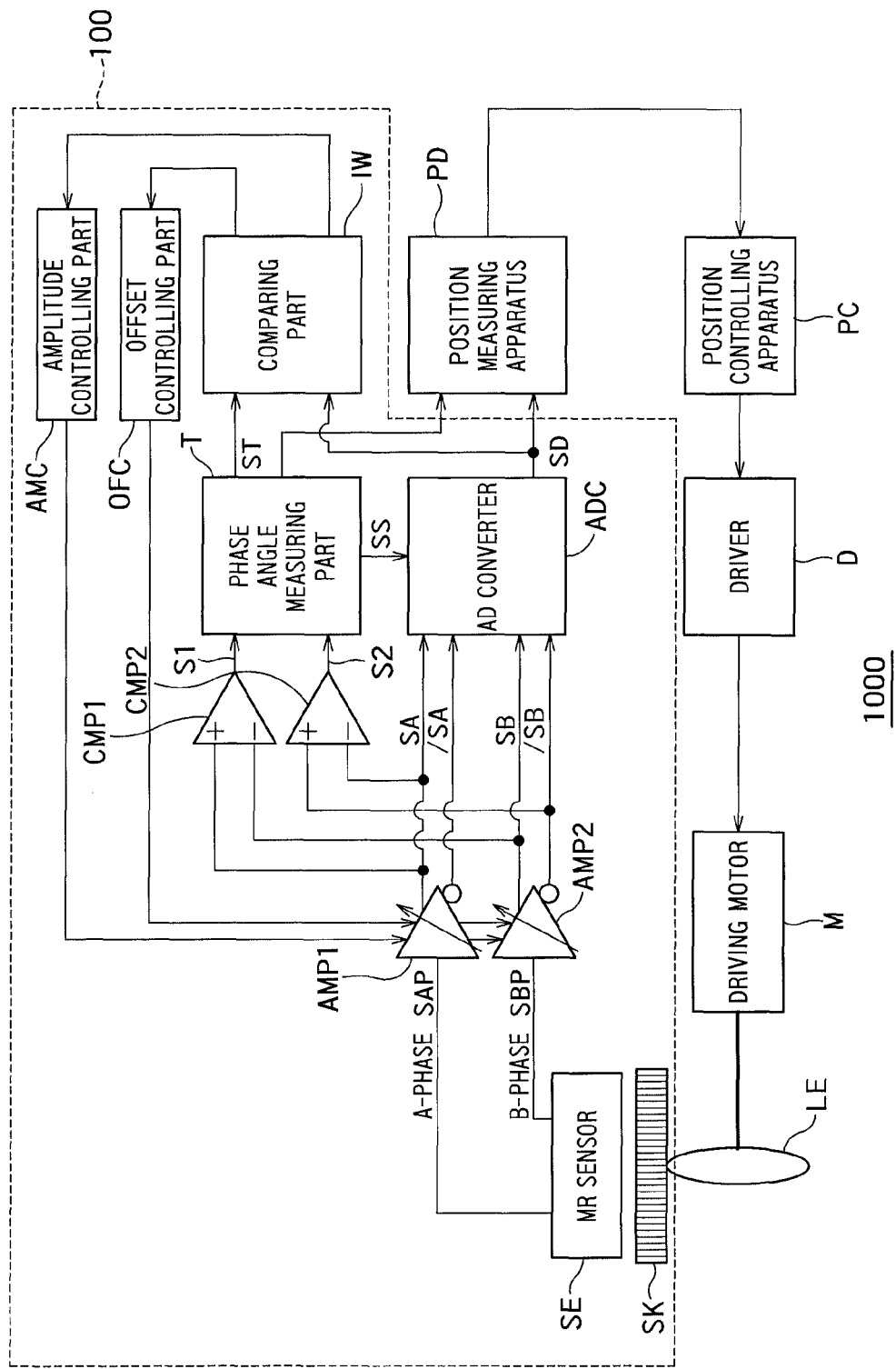
FIG. 1 is a diagram showing an example of a configuration of a driving system 1000 that incorporates a position detecting apparatus 100 according to a first embodiment.

A position detecting apparatus according to an embodiment includes a sensor that outputs two position detection signals with different phases that vary with a same amplitude and a same period in response to a relative movement with respect to a scale. The position detecting apparatus includes a first amplifier that outputs a first amplified signal obtained by amplifying an amplitude of a first position detection signal with a first phase of the position detection signals and a first inverted signal obtained by inverting the first amplified signal. The position detecting apparatus includes a second amplifier that outputs a second amplified signal obtained by amplifying an amplitude of a second position detection signal with a second phase of the position detection signals and a second inverted signal obtained by inverting the second amplified signal. The position detecting apparatus includes a first comparator that compares the first amplified signal and the second amplified signal and outputs a first comparison signal responsive to a result of the comparison. The position detecting apparatus includes a second comparator that compares the first amplified signal and the second inverted signal and outputs a second comparison signal responsive to a result of the comparison. The position detecting apparatus includes a phase angle measuring part that measures phase angles of the position detection signals with respect to a reference position, outputs a selection signal that prescribes which one of the first amplified signal, the second amplified signal, the first inverted signal and the second inverted signal should be selected, and outputs a timing signal that prescribes timings at which two of the first amplified signal, the second amplified signal, the first inverted signal and the second inverted signal intersect with each other. The position detecting apparatus includes an AD converter that receives the first amplified signal, the second amplified signal, the first inverted signal and the second inverted signal, continuously reads a value of a signal selected according to the selection signal from among the first amplified signal, the second amplified signal, the first inverted signal and the second inverted signal, and outputs a digital signal responsive to the read value. The position detecting apparatus includes a comparing part that compares the value of the digital signal output from the AD converter and a reference value that is based on a preset reference amplitude at the timings and outputs a control signal responsive to a result of the comparison. The position detecting apparatus includes an amplitude controlling part that controls amplification factors of the first amplifier and the second amplifier in such a manner that the value of the digital signal output from the AD converter comes closer to the reference value in response to the control signal output from the comparing part.

In the following, an embodiment will be described with reference to the drawings.

First Embodiment

FIG. 1 is a diagram showing an example of a configuration of a driving system 1000 that incorporates a position detecting apparatus 100 according to a first embodiment.

As shown in FIG. 1, the driving system 1000 includes a movable body "LE", a driving motor "M", a position measuring apparatus "PD", a position controlling apparatus "PC", a driver "D", and the position detecting apparatus 100.

In this embodiment, the movable body "LE" is a lens, for example.

When the driving motor "M" is driven, the driving motor "M" moves the movable body "LE". The driving motor "M" is a linear motor, for example.

The driver "D" drives the driving motor "M".

The position detecting apparatus 100 outputs a signal responsive to the position of the movable body "LE" (a phase angle measurement result and a digital signal described later).

The position measuring apparatus "PD" obtains the position of the movable body "LE" (position with respect to a reference position indicated by a position detection signal described later) based on the signal output from the position detecting apparatus 100.

The position controlling apparatus "PC" controls the driver "D" based on the position obtained by the position measuring apparatus "PD".

As shown in FIG. 1, the position detecting apparatus 100 includes a magnetic scale (scale) "SK", an MR sensor (sensor) "SE", a first amplifier "AMP1", a second amplifier "AMP2", a first comparator "CMP1", a second comparator "CMP2", a phase angle measuring part "T", an AD comparator "ADC", a comparing part "IW", an amplitude controlling part "AMC", and an offset controlling part "OFC", for example.

The magnetic scale "SK" is magnetized in a predetermined pattern.

The MR sensor "SE" outputs two position detection signals "SAP" and "SBP" with different phases (A phase and B phase) that vary in a sine-wave pattern with a same amplitude and a same period in response to a relative movement with respect to the magnetic scale "SK".

In this embodiment, the position detection signal "SAP" is a first position detection signal with a first phase (A phase) that varies in a sine-wave pattern, and the position detection signal "SBP" is a second position detection signal with a second phase (B phase) that varies in a sine-wave pattern, and the phase difference between the first position detection signal "SAP" and the second position detection signal "SBP" is 90 degrees, for example.

The first amplifier "AMP1" outputs a first amplified signal "SA" obtained by amplifying the amplitude of the first position detection signal "SAP" with the first phase (A phase) that varies in a sine-wave pattern and a first inverted signal "/SA" obtained by inverting the first amplified signal "SA".

The second amplifier "AMP2" outputs a second amplified signal "SB" obtained by amplifying the amplitude of the second position detection signal "SBP" with the second phase (B phase) that varies in a sine-wave pattern and a second inverted signal "/SB" obtained by inverting the second amplified signal "SB".

As shown in FIG. 1, the first comparator "CMP1" receives the first amplified signal "SA" at a non-inverting input terminal thereof and the second amplified signal "SB" at an inverting input terminal thereof, and outputs a first comparison signal "S1" at an output thereof. The first comparator "CMP1" compares the first amplified signal "SA" and the second amplified signal "SB", and outputs the first comparison signal "S1" responsive to a result of the comparison.

For example, in a case where the voltage of the first amplified signal "SA" is equal to or higher than the voltage of the second amplified signal "SB", the first comparator "CMP1" sets the first comparison signal "S1" at a "High" level.

On the other hand, in a case where the voltage of the first amplified signal "SA" is lower than the voltage of the second amplified signal "SB", the first comparator "CMP1" sets the first comparison signal "S1" at a "Low" level.

As shown in FIG. 1, the second comparator "CMP2" receives the second inverted signal "/SB" at a non-inverting input terminal thereof and the first amplified signal "SA" at an inverting input terminal thereof, and outputs a second comparison signal "S2" at an output thereof. The second comparator "CMP2" compares the first amplified signal "SA" and the second inverted signal "/SB", and outputs the second comparison signal "S2" responsive to a result of the comparison.

For example, in a case where the voltage of the second inverted signal "/SB" is equal to or higher than the voltage of the first amplified signal "SA", the second comparator "CMP2" sets the second comparison signal "S2" at the "High" level.

On the other hand, in a case where the voltage of the second inverted signal "/SB" is lower than voltage of the first amplified signal "SA", the second comparator "CMP2" sets the second comparison signal "S2" at the "Low" level.

The phase angle measuring part "T" measures phase angles of the position detection signals "SAP" and "SBP" with respect to the reference position. The phase angle measuring part "T" outputs the phase angle measurement result described above, which is the phase angles of the position detection signals "SAP" and "SBP" measured with respect to the preset reference position.

The phase angle measuring part "T" also outputs a selection signal "SS" that prescribes which one of the first amplified signal "SA", the second amplified signal "SB", the first inverted signal "/SA" and the second inverted signal "/SB" should be selected.

More specifically, for example, in a case where the voltage of the first amplified signal "SA" is equal to or higher than the voltage of the second amplified signal "SB", and the voltage of the second inverted signal "/SB" is lower than the first amplified signal "SA", the phase angle measuring part "T" outputs the selection signal "SS" that prescribes to select the second inverted signal "/SB".

In a case where the voltage of the first amplified signal "SA" is equal to or higher than the voltage of the second amplified signal "SB", and the voltage of the second inverted signal "/SB" is equal to or higher than the first amplified signal "SA", the phase angle measuring part "T" outputs the selection signal "SS" that prescribes to select the first inverted signal "/SA".

In a case where the voltage of the first amplified signal "SA" is lower than the voltage of the second amplified signal "SB", and the voltage of the second inverted signal "/SB" is equal to or higher than the first amplified signal "SA", the phase angle measuring part "T" outputs the selection signal "SS" that prescribes to select the second amplified signal "SB".

In a case where the voltage of the first amplified signal "SA" is lower than the voltage of the second amplified signal "SB", and the voltage of the second inverted signal "/SB" is lower than the first amplified signal "SA", the phase angle measuring part "T" outputs the selection signal "SS" that prescribes to select the first amplified signal "SA".

Furthermore, the phase angle measuring part "T" outputs a timing signal "ST" that prescribes timings at which two of the first amplified signal "SA", the second amplified signal "SB", the first inverted signal "/SA" and the second inverted signal "/SB" intersect with each other.

More specifically, the timing signal "ST" prescribes a first timing at which the voltage of the first amplified signal "SA" becomes equal to or higher than the voltage of the second amplified signal "SB", a second timing at which the voltage of the second inverted signal "/SB" becomes equal to or higher than the voltage of the first amplified signal "SA", a third timing at which the voltage of the first amplified signal "SA" becomes lower than the voltage of the second amplified signal "SB", and a fourth timing at which the voltage of the second inverted signal "/SB" becomes lower than the voltage of the first amplified signal "SA".

The AD converter "ADC" receives the first amplified signal "SA", the second amplified signal "SB", the first inverted signal "/SA" and the second inverted signal "/SB".

The AD converter "ADC" continuously reads the value of the signal selected according to the selection signal "SS" from among the first amplified signal "SA", the second amplified signal "SB", the first inverted signal "/SA" and the second inverted signal "/SB", and outputs a digital signal "SD" responsive to the read value.

The comparing part "IW" compares the value of the digital signal "SD" and a reference value that is based on a preset reference amplitude at the timings prescribed by the timing signal "ST", and outputs a control signal responsive to a result of the comparison.

For example, the comparing part "IW" compares the value of the digital signal "SD" and the reference value at the first to fourth timings prescribed by the timing signal "ST".

In response to the control signal output from the comparing part "IW", the amplitude controlling part "AMC" controls amplification factors of the first amplifier "AMP1" and the second amplifier "AMP2" in such a manner that the value of the digital signal "SD" comes closer to the reference value described above.

More specifically, for example, in a case where the value of the digital signal "SD" is higher than the reference value, the amplitude controlling part "AMC" decreases the amplification factors of the first amplifier "AMP1" and the second amplifier "AMP2".

On the other hand, in a case where the value of the digital signal "SD" is lower than the reference value, the amplitude controlling part "AMC" increases the amplification factors of the first amplifier "AMP1" and the second amplifier "AMP2".

By the operation described above, the amplitudes of the first amplified signal "SA", the second amplified signal "SB", the first inverted signal "/SA" and the second inverted signal "/SB" are controlled to a predetermined level.

The amplitude controlling part "AMC" controls the amplification factor of the first amplifier "AMP1" and the amplification factor of the second amplifier "AMP2" in such a manner that the amplification factors become equal to each other. As a result, the first amplified signal "SA", the second amplified signal "SB", the first inverted signal "/SA" and the second inverted signal "/SB" are controlled to have a same amplitude.

The offset controlling part "OFC" controls offset voltages of the first amplifier "AMP1" and the second amplifier "AMP2" before the amplitude controlling part "AMC" controls the amplification factors of the first amplifier "AMP1" and the second amplifier "AMP2".

Therefore, the amplification factors of the first amplifier "AMP1" and the second amplifier "AMP2" can be controlled with the offset voltages of the first amplifier "AMP1" and the second amplifier "AMP2" set at a predetermined level.

Figure 2:
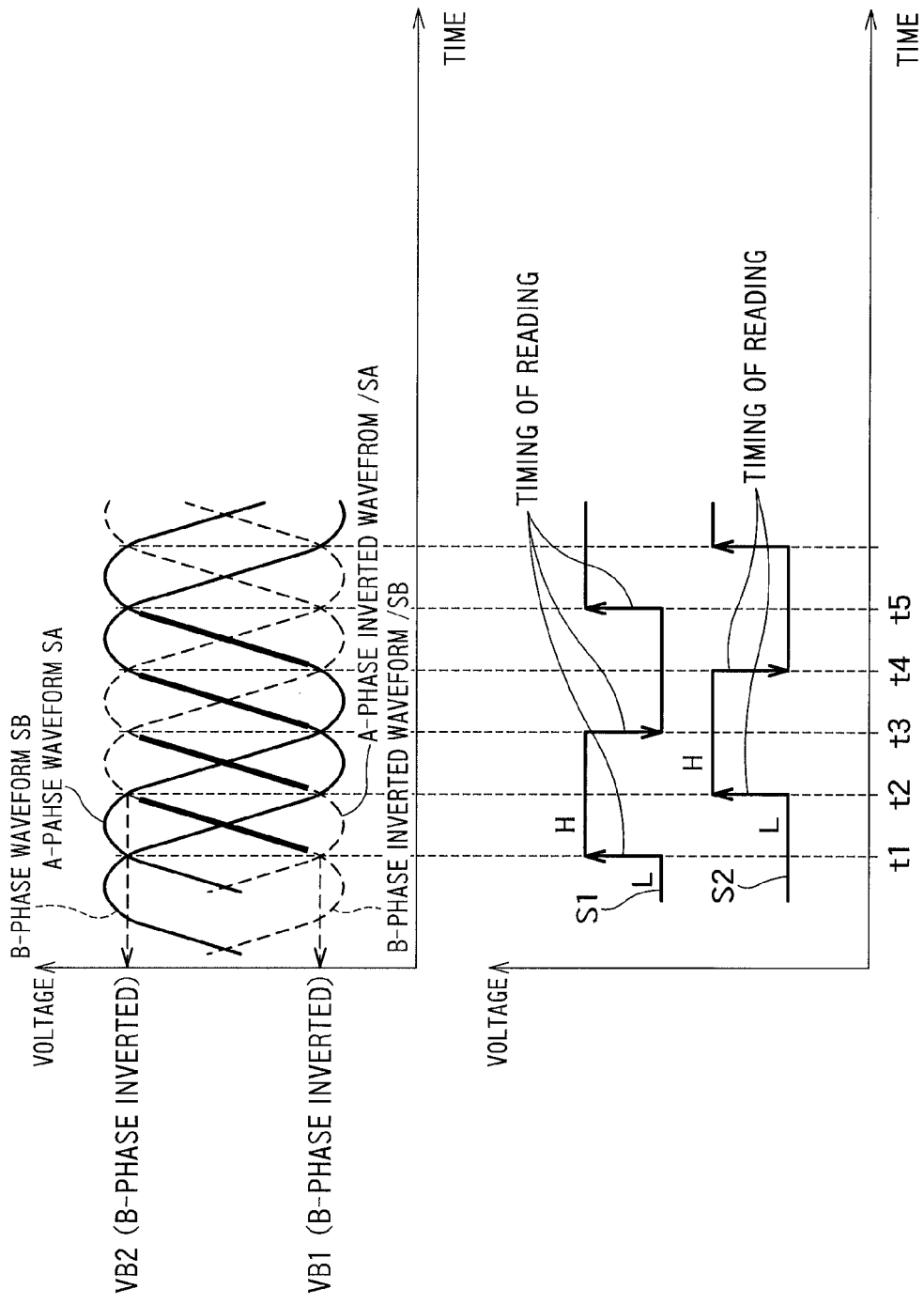
FIG. 2 is a waveform diagram showing examples of signals involved with the position detecting apparatus 100 shown in FIG. 1.
Figure 3:
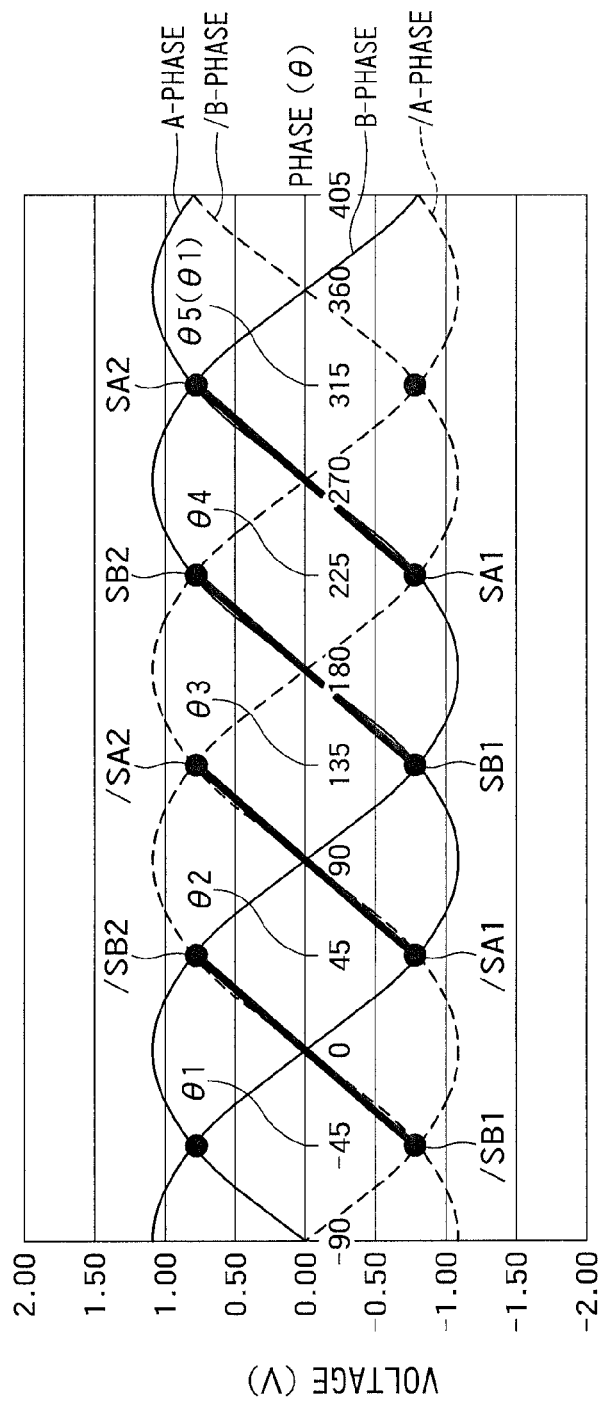
FIG. 3 is a waveform diagram showing a relationship between the amplitude (voltage) and the phase of the signals output from the first amplifier "AMP1" and the second amplifier "AMP2" shown in FIG. 1.

Next, an example of an operation of the position detecting apparatus 100 configured as described above will be described. FIG. 2 is a waveform diagram showing examples of signals involved with the position detecting apparatus 100 shown in FIG. 1. FIG. 3 is a waveform diagram showing a relationship between the amplitude (voltage) and the phase of the signals output from the first amplifier "AMP1" and the second amplifier "AMP2" shown in FIG. 1.

As shown in FIG. 2, when the voltage of the first amplified signal "SA" (with the A-phase waveform) becomes equal to or higher than the voltage of the second amplified signal "SB" (with the B-phase waveform), the first comparator "CMP1" sets the first comparison signal "S1" at the "High" level (at a time "t1").

When the voltage of the second inverted signal "/SB" (with the B-phase inverted waveform) becomes equal to or higher than the voltage of the first amplified signal "SA", the second comparator "CMP2" sets the second comparison signal "S2" at the "High" level (at a time "t2").

When the voltage of the first amplified signal "SA" becomes lower than the voltage of the second amplified signal "SB", the first comparator "CMP1" sets the first comparison signal "S1" at the "Low" level (at a time "t3").

When the voltage of the second inverted signal "/SB" becomes lower than the voltage of the first amplified signal "SA", the second comparator "CMP2" sets the second comparison signal "S2" at the "Low" level (at a time "t4").

When the voltage of the first amplified signal "SA" becomes equal to or higher than the voltage of the second amplified signal "SB", the first comparator "CMP1" sets the first comparison signal "S1" at the "High" level (at a time "t5").

As described above, the phase angle measuring part "T" outputs the selection signal "SS" that prescribes which one of the first amplified signal "SA", the second amplified signal "SB", the first inverted signal "/SA" and the second inverted signal "/SB" should be selected.

In the period from the time "t1" to the time "t2" in which the voltage of the first amplified signal "SA" is equal to or higher than the voltage of the second amplified signal "SB", and the voltage of the second inverted signal "/SB" is lower than the first amplified signal "SA", the phase angle measuring part "T" outputs the selection signal "SS" that prescribes to select the second inverted signal "/SB".

In the period from the time "t2" to the time "t3" in which the voltage of the first amplified signal "SA" is equal to or higher than the voltage of the second amplified signal "SB", and the voltage of the second inverted signal "/SB" is equal to or higher than the first amplified signal "SA", the phase angle measuring part "T" outputs the selection signal "SS" that prescribes to select the first inverted signal "/SA".

In the period from the time "t3" to the time "t4" in which the voltage of the first amplified signal "SA" is lower than the voltage of the second amplified signal "SB", and the voltage of the second inverted signal "/SB" is equal to or higher than the first amplified signal "SA", the phase angle measuring part "T" outputs the selection signal "SS" that prescribes to select the second amplified signal "SB".

In the period from the time "t4" to the time "t5" in which the voltage of the first amplified signal "SA" is lower than the voltage of the second amplified signal "SB", and the voltage of the second inverted signal "/SB" is lower than the first amplified signal "SA", the phase angle measuring part "T" outputs the selection signal "SS" that prescribes to select the first amplified signal "SA".

Furthermore, the phase angle measuring part "T" outputs the timing signal "ST" that prescribes timings at which two of the first amplified signal "SA", the second amplified signal "SB", the first inverted signal "/SA" and the second inverted signal "/SB" intersect with each other.

The timing signal "ST" prescribes the first timing (times "t1" and "t5") at which the voltage of the first amplified signal "SA" becomes equal to or higher than the voltage of the second amplified signal "SB", the second timing (time "t2") at which the voltage of the second inverted signal "/SB" becomes equal to or higher than the voltage of the first amplified signal "SA", the third timing (time "t3") at which the voltage of the first amplified signal "SA" becomes lower than the voltage of the second amplified signal "SB", and the fourth timing (time "t4") at which the voltage of the second inverted signal "/SB" becomes lower than the voltage of the first amplified signal "SA".

The AD converter "ADC" then continuously reads the value of the signal selected according to the selection signal "SS" from among the first amplified signal "SA", the second amplified signal "SB", the first inverted signal "/SA" and the second inverted signal "/SB", and outputs the digital signal "SD" responsive to the read value.

The comparing part "IW" then compares the value of the digital signal "SD" output from the AD converter "ADC"

and the reference value at the first to fourth timings (times "t1", "t2", "t3" and "t4") prescribed by the timing signal "ST", and outputs the control signal responsive to the result of the comparison.

In response to the control signal output from the comparing part "IW", the amplitude controlling part "AMC" controls the amplification factors of the first amplifier "AMP1" and the second amplifier "AMP2" in such a manner that the value of the digital signal "SD" output from the AD converter "ADC" comes closer to the reference value described above.

As a result, the amplitudes of the four signals, that is, the first amplified signal "SA", the second amplified signal "SB", the first inverted signal "/SA" and the second inverted signal "/SB" are controlled to a predetermined level.

In this way, the amplitudes can be monitored in real time, and a feedback response can be made in real time to an external factor, such as a temperature change.

It is assumed here that the "ADC" conversion results at the timings prescribed by the timing signal "ST" are denoted as a B-phase inverted waveform level "VB1" at the time "t1", a B-phase inverted waveform level "VB2" at the time "t2" and so on, for example. An amplitude value "X" can then be expressed as follows. Note that it is assumed that a temperature change after offset adjustment of a sine wave is negligible, and the relative amplitude ratio between the A-phase amplitude and the B-phase amplitude after amplitude adjustment is 1.

$$X=(VB2-VB1)/(2*\sin 45°)$$

In this way, at time times "t1" and "t2", the amplitude of the second inverted signal "/SB" (B-phase inverted) is calculated.

Similarly, at the times "t2" and "t3", the amplitude of the first inverted signal "/SA" (A-phase inverted) is calculated. Furthermore, at the times "t3" and "t4", the amplitude of the second amplified signal "SB" (B-phase positive) is calculated. Furthermore, at the times "t4" and "t5", the amplitude of the first amplified signal "SA" (A-phase positive) is calculated.

A waveform "YA" of the first amplified signal "SA" with the A phase is expressed by the following formula (1).

$$YA=KA*\sin(\theta) \quad (1)$$

A waveform "YB" of the second amplified signal "SB" with the B-phase is expressed by the following formula (2).

$$YB=KB*\cos(\theta) \quad (2)$$

An inverted waveform "Y/A" of the first inverted signal "/SA" with the A phase is expressed by the following formula (3).

$$Y/A=-(KA*\sin(\theta)) \quad (3)$$

An inverted waveform "Y/B" of the second inverted signal "/SB" with the B phase is expressed by the following formula (4).

$$Y/B=-(KB*\cos(\theta)) \quad (4)$$

If a deviation between amplitudes "KA" and "KB" occurs in the two signals with different phases expressed by the formulas (1) to (4) described above, relationships expressed by the following formulas (5) to (8) hold at the times "t1" to "t5" shown in FIG. 2. The offset voltage is based on the assumption that a temperature drift is sufficiently small after adjustment. A relative amplitude of the amplitudes "KA" and "KB" is a temperature coefficient of physical properties and therefore is supposed to vary with the same rate, and a relation holds: KA=KB=K.

For example, at the time "t1", the relations expressed by the following formulas (5) and (6) hold at the cross points of the A phase and the B phase, as can be derived from the formulas (1) and (2) described above.

$$K*\sin(\theta)=K*\cos(\theta) \quad (5)$$

$$\text{Tan}(\theta)=1 \quad (6)$$

At the time "t3", the relations expressed by the following formulas (7) and (8) hold at the cross points of the A phase and the B phase, as can be derived from the formulas (1) and (4) described above.

$$K*\sin(\theta)=-K*\cos(\theta) \quad (7)$$

$$\text{Tan}(\theta)=-1 \quad (8)$$

Therefore, in this case, the phase $\theta$ is −45 degrees, 45 degrees, 135 degrees, and 224 degrees (FIG. 3). Therefore, the amplitudes "KA" and "KB" are expressed by the following formula (9). In the formula (9), SX=SA2−SA1, SB2−SB1, /SA2−/SA1 or /SB2−/SB1.

$$KA=KB=K=SX/(2*\sin 45°) \quad (9)$$

By capturing the value of the digital signal "SD" at the timings of the cross points as described above, the voltages (amplitudes) of the first amplified signal "SA" and the second amplified signal "SB" at each position (phase) can be dynamically detected and corrected.

As described above, with the position detecting apparatus according to the first embodiment, position detection errors can be reduced. Therefore, the precision of position detection can be maintained or improved, and at the same time, the resolution of position detection can be improved.

In particular, the resolution of position detection can be improved and the number of components, such as a temperature sensor, can be reduced by compensating for a dynamic amplitude change in a closed loop.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A position detecting apparatus comprises:
   a sensor that outputs two position detection signals with different phases that vary with a same amplitude and a same period in response to a relative movement with respect to a scale;
   a first amplifier that outputs a first amplified signal obtained by amplifying an amplitude of a first position detection signal with a first phase of the position detection signals and a first inverted signal obtained by inverting the first amplified signal;
   a second amplifier that outputs a second amplified signal obtained by amplifying an amplitude of a second position detection signal with a second phase of the position detection signals and a second inverted signal obtained by inverting the second amplified signal;
   a first comparator that compares the first amplified signal and the second amplified signal and outputs a first comparison signal responsive to a result of the comparison;

a second comparator that compares the first amplified signal and the second inverted signal and outputs a second comparison signal responsive to a result of the comparison;

a phase angle measuring part that measures phase angles of the position detection signals with respect to a reference position, outputs a selection signal that prescribes which one of the first amplified signal, the second amplified signal, the first inverted signal and the second inverted signal should be selected, and outputs a timing signal that prescribes timings at which two of the first amplified signal, the second amplified signal, the first inverted signal and the second inverted signal intersect with each other;

an AD converter that receives the first amplified signal, the second amplified signal, the first inverted signal and the second inverted signal, continuously reads a value of a signal selected according to the selection signal from among the first amplified signal, the second amplified signal, the first inverted signal and the second inverted signal, and outputs a digital signal responsive to the read value;

a comparing part that compares the value of the digital signal output from the AD converter and a reference value that is based on a preset reference amplitude at the timings and outputs a control signal responsive to a result of the comparison; and an amplitude controlling part that controls amplification factors of the first amplifier and the second amplifier in such a manner that the value of the digital signal output from the AD converter comes closer to the reference value in response to the control signal output from the comparing part.

2. The position detecting apparatus according to claim 1, wherein a phase difference between the first position detection signal and the second position detection signal is 90 degrees.

3. The position detecting apparatus according to claim 2, wherein the timing signal prescribes a first timing at which a voltage of the first amplified signal becomes equal to or higher than a voltage of the second amplified signal, a second timing at which a voltage of the second inverted signal becomes equal to or higher than the voltage of the first amplified signal, a third timing at which the voltage of the first amplified signal becomes lower than the voltage of the second amplified signal, and a fourth timing at which the voltage of the second inverted signal becomes lower than the voltage of the first amplified signal, and the comparing part compares the value of the digital signal output from the AD converter and the reference value at the first to fourth timings prescribed by the timing signal.

4. The position detecting apparatus according to claim 2, wherein the phase angle measuring part outputs the selection signal that prescribes to select the second inverted signal in a case where the voltage of the first amplified signal is equal to or higher than the voltage of the second amplified signal, and the voltage of the second inverted signal is lower than the first amplified signal, outputs the selection signal that prescribes to select the first inverted signal in a case where the voltage of the first amplified signal is equal to or higher than the voltage of the second amplified signal, and the voltage of the second inverted signal is equal to or higher than the first amplified signal, outputs the selection signal that prescribes to select the second amplified signal in a case where the voltage of the first amplified signal is lower than the voltage of the second amplified signal, and the voltage of the second inverted signal is equal to or higher than the first amplified signal, and outputs the selection signal that prescribes to select the first amplified signal in a case where the voltage of the first amplified signal is lower than the voltage of the second amplified signal, and the voltage of the second inverted signal is lower than the first amplified signal.

5. The position detecting apparatus according to claim 1, wherein the amplitude controlling part decreases the amplification factors of the first amplifier and the second amplifier in a case where the value of the digital signal is higher than the reference value, and increases the amplification factors of the first amplifier and the second amplifier in a case where the value of the digital signal is lower than the reference value.

6. The position detecting apparatus according to claim 1, wherein the timing signal prescribes a first timing at which a voltage of the first amplified signal becomes equal to or higher than a voltage of the second amplified signal, a second timing at which a voltage of the second inverted signal becomes equal to or higher than the voltage of the first amplified signal, a third timing at which the voltage of the first amplified signal becomes lower than the voltage of the second amplified signal, and a fourth timing at which the voltage of the second inverted signal becomes lower than the voltage of the first amplified signal, and the comparing part compares the value of the digital signal output from the AD converter and the reference value at the first to fourth timings prescribed by the timing signal.

7. The position detecting apparatus according to claim 1, wherein the phase angle measuring part outputs the selection signal that prescribes to select the second inverted signal in a case where the voltage of the first amplified signal is equal to or higher than the voltage of the second amplified signal, and the voltage of the second inverted signal is lower than the first amplified signal, outputs the selection signal that prescribes to select the first inverted signal in a case where the voltage of the first amplified signal is equal to or higher than the voltage of the second amplified signal, and the voltage of the second inverted signal is equal to or higher than the first amplified signal, outputs the selection signal that prescribes to select the second amplified signal in a case where the voltage of the first amplified signal is lower than the voltage of the second amplified signal, and the voltage of the second inverted signal is equal to or higher than the first amplified signal, and outputs the selection signal that prescribes to select the first amplified signal in a case where the voltage of the first amplified signal is lower than the voltage of the second amplified signal, and the voltage of the second inverted signal is lower than the first amplified signal.

8. The position detecting apparatus according to claim 1, wherein the first comparator receives the first amplified signal at a non-inverting input terminal thereof and the second amplified signal at an inverting input terminal thereof and outputs the first comparison signal at an output thereof, and the second comparator receives the second inverted signal at a non-inverting input terminal thereof and the first amplified signal at an inverting input terminal thereof and outputs the second comparison signal at an output thereof.

9. The position detecting apparatus according to claim 1, further comprising:
an offset controlling part that controls offset voltages of the first amplifier and the second amplifier before the amplitude controlling part controls the amplification factors of the first amplifier and the second amplifier.

10. The position detecting apparatus according to claim 1, wherein the amplitude controlling part controls the amplification factor of the first amplifier and the amplification factor of the second amplifier in such a manner that the amplification factors become equal to each other.

11. A driving system, comprising:
a movable body;
a driving motor that moves the movable body;
a driver that drives the driving motor;
a position detecting apparatus that outputs a signal responsive to a position of the movable body;
a position measuring apparatus that obtains the position of the movable body based on the signal output from the position detecting apparatus; and
a position controlling apparatus that controls the driver based on the position obtained by the position measuring apparatus,
wherein the position detecting apparatus comprises:
a scale;
a sensor that outputs two position detection signals with different phases that vary with a same amplitude and a same period in response to a relative movement with respect to the scale;
a first amplifier that outputs a first amplified signal obtained by amplifying an amplitude of a first position detection signal with a first phase of the position detection signals and a first inverted signal obtained by inverting the first amplified signal;
a second amplifier that outputs a second amplified signal obtained by amplifying an amplitude of a second position detection signal with a second phase of the position detection signals and a second inverted signal obtained by inverting the second amplified signal;
a first comparator that compares the first amplified signal and the second amplified signal and outputs a first comparison signal responsive to a result of the comparison;
a second comparator that compares the first amplified signal and the second inverted signal and outputs a second comparison signal responsive to a result of the comparison;
a phase angle measuring part that measures phase angles of the position detection signals with respect to a reference position, outputs a selection signal that prescribes which one of the first amplified signal, the second amplified signal, the first inverted signal and the second inverted signal should be selected, and outputs a timing signal that prescribes timings at which two of the first amplified signal, the second amplified signal, the first inverted signal and the second inverted signal intersect with each other;
an AD converter that receives the first amplified signal, the second amplified signal, the first inverted signal and the second inverted signal, continuously reads a value of a signal selected according to the selection signal from among the first amplified signal, the second amplified signal, the first inverted signal and the second inverted signal, and outputs a digital signal responsive to the read value;
a comparing part that compares the value of the digital signal output from the AD converter and a reference value that is based on a preset reference amplitude at the timings and outputs a control signal responsive to a result of the comparison; and
an amplitude controlling part that controls amplification factors of the first amplifier and the second amplifier in such a manner that the value of the digital signal output from the AD converter comes closer to the reference value in response to the control signal output from the comparing part.

12. The driving system according to claim 11, wherein a phase difference between the first position detection signal and the second position detection signal is 90 degrees.

13. The driving system according to claim 12, wherein the timing signal prescribes a first timing at which a voltage of the first amplified signal becomes equal to or higher than a voltage of the second amplified signal, a second timing at which a voltage of the second inverted signal becomes equal to or higher than the voltage of the first amplified signal, a third timing at which the voltage of the first amplified signal becomes lower than the voltage of the second amplified signal, and a fourth timing at which the voltage of the second inverted signal becomes lower than the voltage of the first amplified signal, and
the comparing part compares the value of the digital signal output from the AD converter and the reference value at the first to fourth timings prescribed by the timing signal.

14. The driving system according to claim 12, wherein the phase angle measuring part
outputs the selection signal that prescribes to select the second inverted signal in a case where the voltage of the first amplified signal is equal to or higher than the voltage of the second amplified signal, and the voltage of the second inverted signal is lower than the first amplified signal,
outputs the selection signal that prescribes to select the first inverted signal in a case where the voltage of the first amplified signal is equal to or higher than the voltage of the second amplified signal, and the voltage of the second inverted signal is equal to or higher than the first amplified signal,
outputs the selection signal that prescribes to select the second amplified signal in a case where the voltage of the first amplified signal is lower than the voltage of the second amplified signal, and the voltage of the second inverted signal is equal to or higher than the first amplified signal, and
outputs the selection signal that prescribes to select the first amplified signal in a case where the voltage of the first amplified signal is lower than the voltage of the second amplified signal, and the voltage of the second inverted signal is lower than the first amplified signal.

15. The driving system according to claim 11, wherein the amplitude controlling part
decreases the amplification factors of the first amplifier and the second amplifier in a case where the value of the digital signal is higher than the reference value, and
increases the amplification factors of the first amplifier and the second amplifier in a case where the value of the digital signal is lower than the reference value.

16. The driving system according to claim 11, wherein the timing signal prescribes a first timing at which a voltage of the first amplified signal becomes equal to or higher than a voltage of the second amplified signal, a second timing at which a voltage of the second inverted signal becomes equal to or higher than the voltage of the first amplified signal, a third timing at which the voltage of the first amplified signal becomes lower than the voltage of the second amplified signal, and a fourth timing at which the voltage of the second inverted signal becomes lower than the voltage of the first amplified signal, and the comparing part compares the value of the digital signal output from the AD converter and the reference value at the first to fourth timings prescribed by the timing signal.

17. The driving system according to claim 11, wherein the phase angle measuring part outputs the selection signal that prescribes to select the second inverted signal in a case where the voltage of the first amplified signal is equal to or higher than the voltage of the second amplified signal, and the voltage of the second inverted signal is lower than the first amplified signal, outputs the selection signal that prescribes to select the first inverted signal in a case where the voltage of the first amplified signal is equal to or higher than the voltage of the second amplified signal, and the voltage of the second inverted signal is equal to or higher than the first amplified signal, outputs the selection signal that prescribes to select the second amplified signal in a case where the voltage of the first amplified signal is lower than the voltage of the second amplified signal, and the voltage of the second inverted signal is equal to or higher than the first amplified signal, and outputs the selection signal that prescribes to select the first amplified signal in a case where the voltage of the first amplified signal is lower than the voltage of the second amplified signal, and the voltage of the second inverted signal is lower than the first amplified signal.

18. The driving system according to claim 11, wherein the first comparator receives the first amplified signal at a non-inverting input terminal thereof and the second amplified signal at an inverting input terminal thereof and outputs the first comparison signal at an output thereof, and the second comparator receives the second inverted signal at a non-inverting input terminal thereof and the first amplified signal at an inverting input terminal thereof and outputs the second comparison signal at an output thereof.

19. The driving system according to claim 11, further comprising:

an offset controlling part that controls offset voltages of the first amplifier and the second amplifier before the amplitude controlling part controls the amplification factors of the first amplifier and the second amplifier.

20. The driving system according to claim 11, wherein the amplitude controlling part controls the amplification factor of the first amplifier and the amplification factor of the second amplifier in such a manner that the amplification factors become equal to each other.

* * * * *